US006011238A

United States Patent [19]

Bertez et al.

[11] Patent Number: 6,011,238
[45] Date of Patent: Jan. 4, 2000

[54] ELECTRODE FOR A PLASMA TORCH

[75] Inventors: Christophe Bertez, Cergy Saint Christophe; Michel Delzenne, Franconville, both of France

[73] Assignee: La Soudure Autogene Francaise, Paris Cedex, France

[21] Appl. No.: 09/243,817

[22] Filed: Feb. 3, 1999

[30] Foreign Application Priority Data

Feb. 5, 1998 [FR] France .................................. 98 01347

[51] Int. Cl.[7] ..................................................... B23K 10/00

[52] U.S. Cl. ................ 219/121.48; 219/75; 219/121.51; 219/121.59; 219/121.49

[58] Field of Search ......................... 219/121.39, 121.59, 219/121.48, 121.51, 121.5, 121.52, 74, 75

[56] References Cited

U.S. PATENT DOCUMENTS

| | | | |
|---|---|---|---|
| 5,208,441 | 5/1993 | Broberg . | |
| 5,416,296 | 5/1995 | Walters . | |
| 5,451,739 | 9/1995 | Nemchinsky et al. . | |
| 5,514,848 | 5/1996 | Ross et al. | 219/121.52 |
| 5,726,415 | 3/1998 | Luo et al. | 219/121.48 |

*Primary Examiner*—Mark Paschall
*Attorney, Agent, or Firm*—Young & Thompson

[57] ABSTRACT

A plasma torch provided with an electrode (1) having an approximately cylindrical or frustocylindrical elongate shape, the electrode (1) including at least one recess (9) made in at least part of its external peripheral wall (15). In order to deflect and guide the gas flux entering the plasma torch, the recess (9) in the electrode (1) lies opposite the orifice or orifices (7) for introducing or injecting the gas flux into the torch.

14 Claims, 4 Drawing Sheets

FIG. 3a
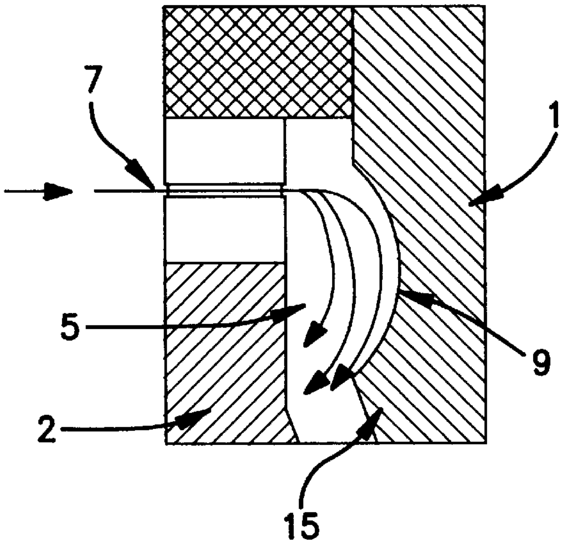
FIG. 3b
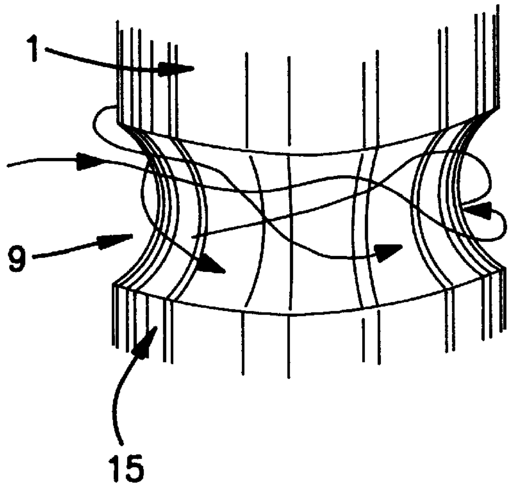
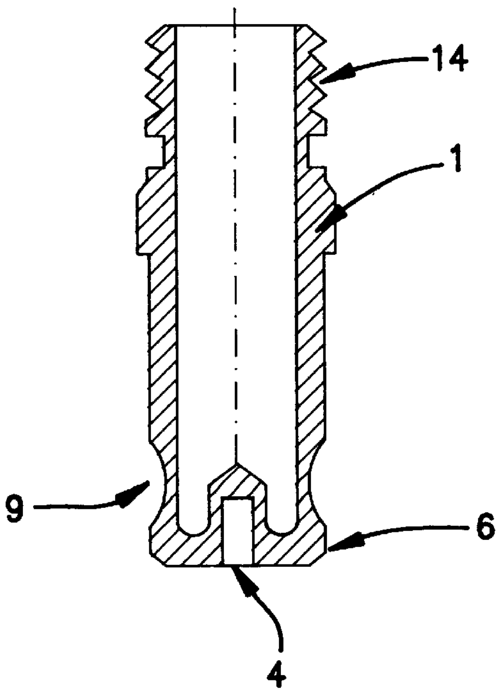
FIG. 4

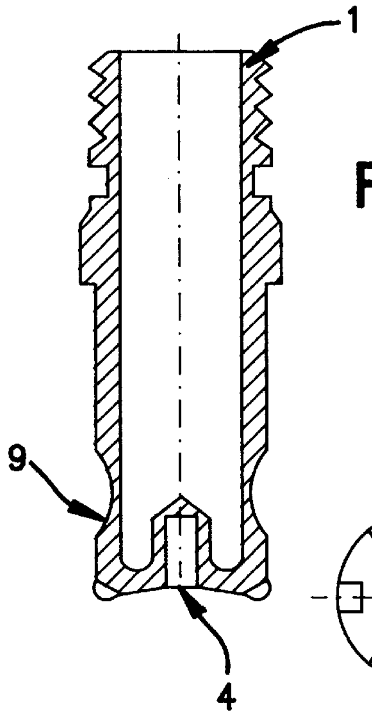
FIG. 5a
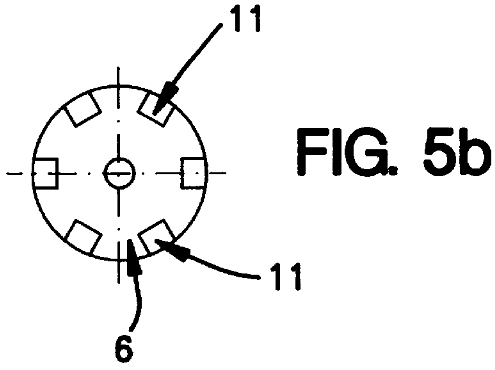
FIG. 5b
FIG. 6a
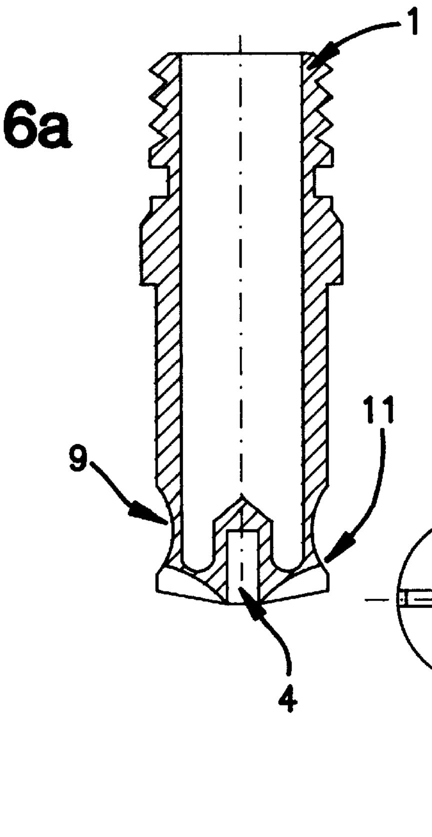
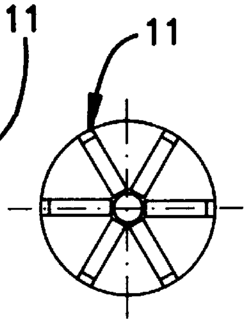
FIG. 6b

ELECTRODE FOR A PLASMA TORCH

FIELD OF THE INVENTION

The present invention relates to a plasma torch provided with an electrode having a peripheral recess intended to deflect and/or guide, i.e. to channel, the gas flux entering the plasma chamber of the torch, and to a plasma welding, marking, cutting, surfacing or spraying process using such a torch.

BACKGROUND OF THE INVENTION

Plasma torches are conventionally used in the fields of cutting or welding of materials as well as in other related fields, such as plasma spraying, surfacing or marking.

A plasma torch usually consists of an electrode, made completely or partly of an emissive material, which electrode has a generally cylindrical or frustocylindrical elongate shape, of a nozzle placed coaxially with respect to the electrode and forming a diaphragm over the path of the plasma arc, of a circuit for internally cooling the torch, especially the electrode, and of one or more circuits for delivering a plasma gas into a chamber bounded, on the one hand, by the electrode and its support and, on the other hand, by the internal part of the nozzle and of its support.

In operation, the electrode is connected to one of the poles of a power supply, while the nozzle is connected to the other pole of the said power supply.

After ionizing part of the gas flux, which flows between the lower end of the electrode and a gas ejection channel made inside the nozzle, a primer electric arc is generated, thus creating an arc plasma column starting from the electrode and extending through the channel in the nozzle to the outside and as far as the material to be cut or welded, for example.

Depending on the type of use of the torch, the plasma jet is raised to a suitable power and maintained between the electrode, forming the cathode for example, and the nozzle, forming the anode, throughout the welding or cutting operation for example, or, depending on the case, the plasma jet is transferred to the workpiece, before the rise in power, by moving closer and by electrical switching, the workpiece then forming the anode and the nozzle then possibly being electrically disconnected.

Such plasma torches and their methods of operation have for example been described in documents EP-A-599,709, EP-A-573,330, U.S. Pat. No. 5,597,497, WO-A-96/23620, U.S. Pat. No. 5,451,739, EP-A-0,787,556, U.S. Pat. No. 5,416,296, U.S. Pat. No. 5,208,441, FR-A-2,669,847 and FR-A-2,113,144.

In certain cases, especially for technical or constructional reasons, the plasma gas is delivered into the chamber bounded by the electrode and the nozzle in an injection plane approximately perpendicular to the axis of the electrode.

Thus, the plasma gas may be injected into the chamber as a ring, centered on the axis of the electrode, via a continuous, circular slot.

In another situation, the plasma gas may be injected into the chamber via a ring-shaped component inside which there are gauged holes whose axes converge on and run into the electrode axis.

Finally, according to another embodiment, the plasma gas may be injected into the chamber via a ring pierced by gauged holes, as in the previous case, but this time these holes emerge tangentially to the bore of the chamber or, in an intermediate arrangement, between tangency to the bore and convergence of the axes of the holes on the electrode axis.

In the first two cases, the gas flux or the gas streams must undergo a sudden change of direction, which occurs when the gas flux is incident on the external periphery of the body of the electrode, or of its support, at an angle which is frequently about 90°.

However, it is known that such normal incidence causes turbulence, or even recirculation regions, within the gas flux and therefore disturbs the flow of the gas flux in the torch.

Therefore, in order to calm or control the flow, it is necessary to make or provide, downstream of the point of injection, a sufficient length of channel without any appreciable variation in the flow conditions so that the gas does not disturb, or disturbs as little as possible, the stability of the arc root attached to the end of the electrode during operation of the plasma torch.

In the latter case, the ring-shaped component pierced by holes, which emerge tangentially to the bore or, depending on the case, in an intermediate direction between tangency and convergence on the electrode axis, delivers the gas with turbulent flow.

However, the gas jets emanating from the injection holes and guided by the wall of the bore generally have a curved path lying approximately in a common plane.

Each gas jet therefore encounters, along its path, the next gas jet, when the order of delivery from the ring-shaped component pierced by holes is taken into consideration.

This therefore results, depending on the speed of flow of the gas jets and the exiguity of the chamber in the radial plane, in a disturbance of the gas flux which may cause stirring of all the gas jets, with the creation of considerable turbulence and an appreciable loss of vorticity or, as the case may be, an overlap of the gas jets in the vertical plane, this overlap being accompanied by extensive arc-root instability.

Consequently, whatever the actual embodiment, it is clear that disturbances to the flow of the gas flux will occur inside the plasma torch, causing appreciable instability of the plasma arc, which in turn has negative repercussions on the work carried out, which is of inferior quality.

SUMMARY OF THE INVENTION

The object of the present invention is therefore to alleviate the above-mentioned problems by providing a plasma-torch electrode designed to allow and facilitate the change of direction of the gas flux or gas streams as they enter the chamber located between the nozzle and the electrode, without creating any significant turbulence in the gas flux.

The present invention therefore relates to a plasma torch comprising a torch body provided with at least one electrode and with at least one approximately coaxial nozzle surrounding at least part of the electrode, the electrode being provided with at least one recess made in at least part of its external peripheral wall, at least one recess being placed opposite at least one orifice for injecting at least one gas flux into the torch body, so that at least part of the gas flux is deflected and/or guided by the recess.

In other words, the plasma torch comprises a torch body having at least one electrode and at least one approximately coaxial nozzle surrounding at least part of the electrode, the torch body containing a plasma chamber bounded at least by the electrode and the nozzle, the electrode being provided with at least one recess made in at least one part of its external peripheral wall, at least one recess being placed at the outlet of at least one orifice for injecting at least one gas flux into the torch body in order to allow a change of direction of at least part of the gas flux entering the plasma chamber, when the gas flux comes into contact with the recess.

Within the context of the invention, “placed opposite” should be understood to mean that a recess made in the electrode lies facing at least one gas-flux injection orifice, that is to say facing the outlet, so that a gas flux flowing through the injection orifice, towards the electrode, comes into contact with the recess made in the electrode.

Depending on the case, the torch according to the invention may comprise one or more of the following characteristics:

the electrode has an elongate or oblong shape, preferably an approximately cylindrical or frustocylindrical general shape;

the recess is made over the entire periphery of the external peripheral wall of the electrode;

the recess has a profiled section and is approximately axisymmetric;

the recess is a groove;

it furthermore includes an emissive insert at its lower end, preferably an emissive insert made of hafnium, zirconium or tungsten;

it furthermore includes at least one slot or serration made in its lower end, preferably several radial slots or serrations;

the axis of at least one injection orifice forms an angle of between 90° and 45° with the axis of the electrode;

the injection orifice and the recess are made, one with respect to the other, so as to allow convergent injection of at least part of the gas flux;

the injection orifice and the recess are made, one with respect to the other, so as to allow at least part of the gas flux to be injected tangentially to the external peripheral wall of the electrode;

the injection orifice and the recess are made, one with respect to the other, so as to allow combined injection of at least part of the gas flux towards the external peripheral wall of the electrode. The expression "combined injection" should be understood to mean injection in an intermediate direction between tangential injection and convergent injection, or a combination of tangential injection and convergent injection.

Within the context of the present invention, the term "injection orifice" is used for one or more holes, perforations, slots and/or the like allowing one or more gas fluxes to enter the plasma chamber of the torch.

According to another aspect, the invention also relates to a plasma welding, cutting, marking, surfacing or spraying process, characterized in that it uses an electrode according to the invention or a plasma torch according to the invention.

In other words, the present invention also relates to the use of such a plasma torch in one of the above-mentioned processes, particularly a process for cutting steels.

BRIEF DESCRIPTION OF THE DRAWINGS

The invention will now be described in greater detail with the aid of drawings, these being given by way of illustration but implying no limitation of the invention.

* and FIGS. 3*a,* 3*b* and 4 to 6 show embodiments of an electrode for a plasma torch according to the present invention.

DETAILED DESCRIPTION OF THE INVENTION

Figure 1A:
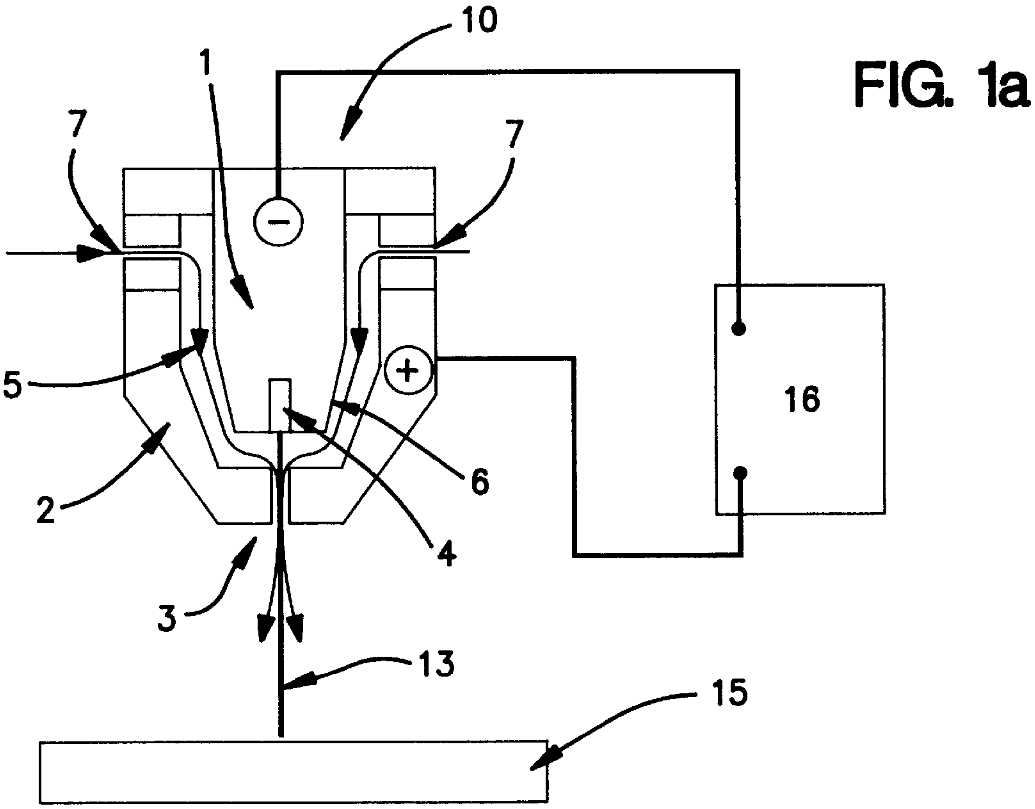
FIGS. 1*a* and 1*b* show diagrams of plasma torches 10 and of their method of operation.
Figure 1B:
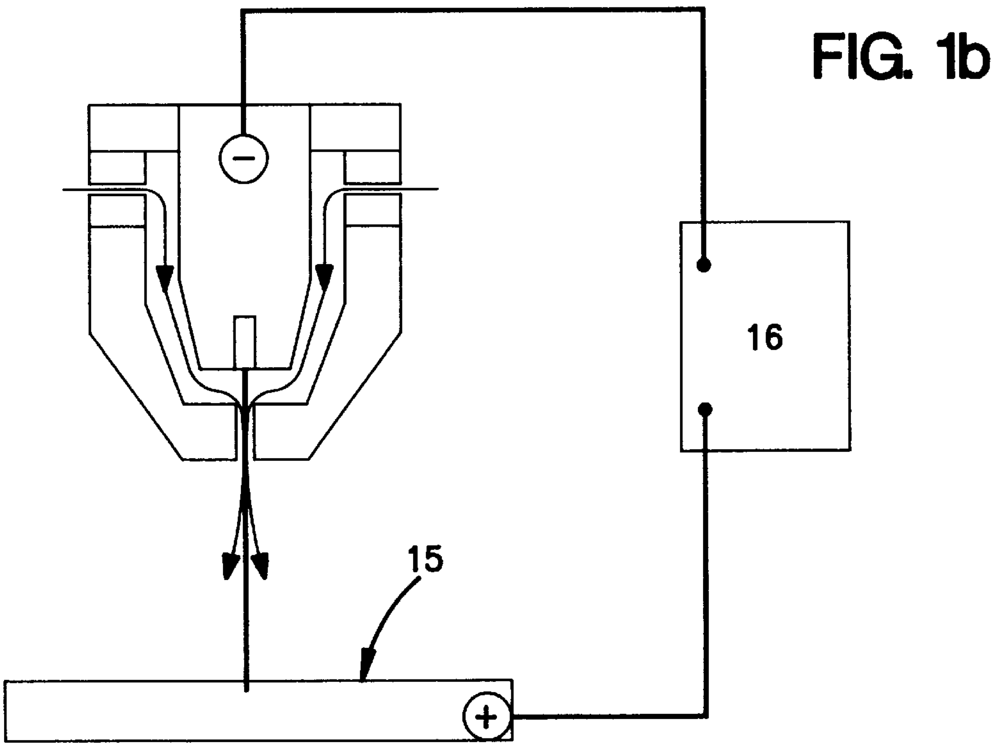

More specifically, FIGS. 1*a* and 1*b* show a plasma torch 10 comprising an electrode with an emissive insert 4 at its lower end 6, which electrode has an approximately frustocylindrical elongate shape and is connected to the negative terminal of a power supply 16.

The electrode 1 is surrounded by a nozzle 2 within which plasma-gas delivery orifices or injection orifices 7 are made, the nozzle 2 being connected to the positive terminal of the power supply 16 (FIG. 1*a*).

More specifically, the electrode 1 and the nozzle 2 are substantially coaxial and define a chamber 5 bounded, on the one hand, by the external peripheral wall of the electrode 1 and, on the other hand, by the internal wall of the nozzle 2.

As may be seen in FIGS. 1*a* and 1*b,* the plasma gas enters via the gas delivery orifices 7 substantially perpendicular to the electrode 1, the gas flux then being deflected towards the lower part 6 of the electrode and then discharged as a plasma jet 13 via the outlet orifice 3 made in the lower part of the nozzle 2, so as to reach the workpiece 15.

In the embodiment in FIG. 1*b,* it is the workpiece 15 which is connected to the positive pole of the power supply 16 and no longer the nozzle 2, as shown in FIG. 1*a;* as regards the rest, the structure of the plasma torch and its operation remain more or less the same.

Figure 2A:
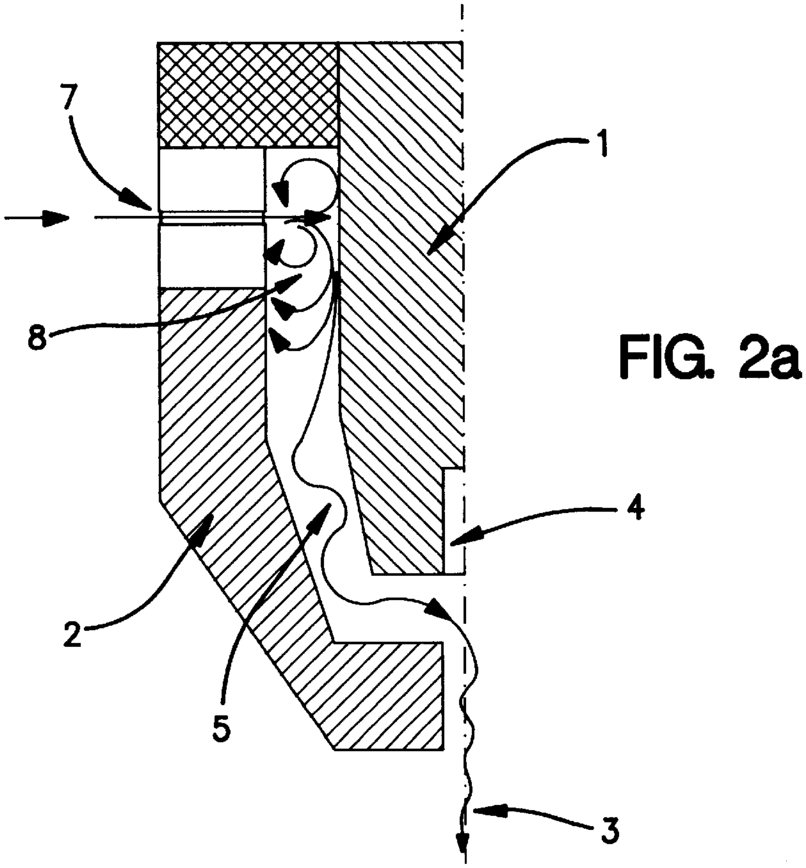
FIGS. 2*a,* 2*b* and 2*c* show, respectively, half-sections of a plasma torch according to FIG. 1*a* or 1*b,* these being a longitudinal half-section in the case of FIG. 2*a* and transverse half-sections in the case of FIGS. 2*b* and 2*c.
Figure 2C:
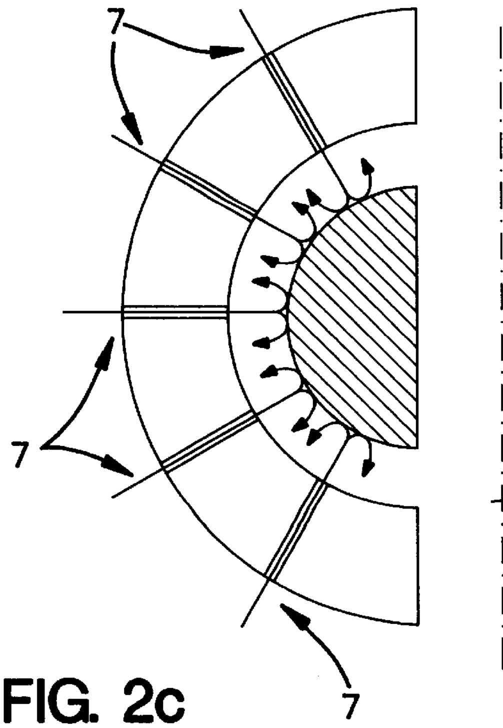
Figure 2B:
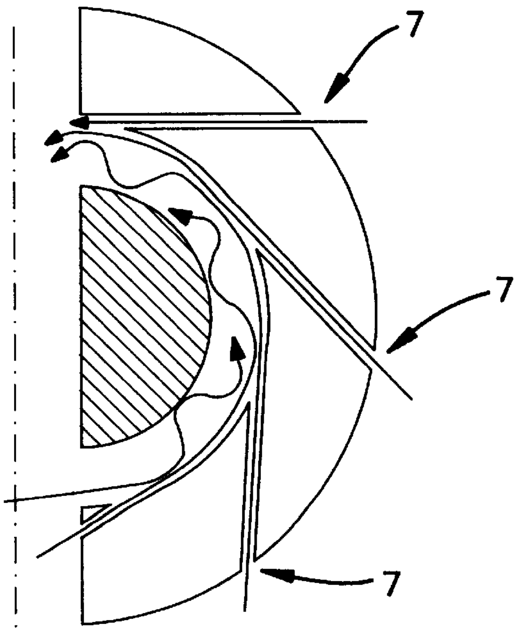

FIGS. 2*a,* 2*b* and 2*c* show, respectively, half-sections of a plasma torch according to FIG. 1*a* or 1*b,* these being a longitudinal half-section in the case of FIG. 2*a* and transverse half-sections in the case of FIGS. 2*b* and 2*c.*

More specifically, FIG. 2*a* shows that the plasma gas enters the chamber 5 via the orifice 7, which is perpendicular to the axis of the electrode 1.

This configuration results in a region of disturbance or turbulence 8 of the plasma gas flux, disturbing the overall flow of the plasma gas within the chamber 5 and as far as the outlet orifice 3, and therefore the stability of the arc root.

Moreover, this is more clearly apparent in FIGS. 2*b* and 2*c* which show embodiments with tangential or convergent gas injection into the chamber 5, respectively.

As regards FIGS. 3*a,* 3*b* and 4 to 6, these show embodiments of an electrode for a plasma torch according to the present invention.

FIG. 3*a* shows a partial longitudinal sectional view of a plasma torch according to the invention, comprising an electrode 1 and a nozzle 2 defining a chamber 5 into which a plasma gas is injected via an injection orifice 7. However, according to another embodiment, the gas may enter the chamber 5 via several injection orifices 7, for example three or four injection orifices 7.

This electrode 1 according to the invention has an approximately cylindrical or frustocylindrical elongate shape and includes a recess, here in the form of a groove 9, made in the external peripheral wall 15 of the electrode 1, so as to form a guide for deflecting the one or more gas fluxes or streams injected into the chamber 5 via the one or more orifices 7.

In practice, the depth and width of the recess 9, that is to say a recess volume, is chosen so as to be sufficient and suitable for allowing an arrangement and a harmonious extension of the gas streams in the chamber 5 so as to facilitate their changes of direction, without forming turbulence, and to facilitate flow of the gas flux inside the chamber 5 as far as the orifice 3 of the nozzle 2, free of any turbulence likely to disturb the stability of the arc root.

FIGS. 3*a* and 3*b* make it possible to visualize the injection of gas into a plasma torch according to the invention. More specifically, FIG. 3*a* makes it possible to visualize the path of the plasma gas flux in a plasma torch with convergent injection and FIG. 3*b* shows the path of the plasma gas in a torch with tangential injection.

FIG. 4 shows a longitudinal sectional view of an electrode 1 according to the invention, which electrode includes an emissive insert 4 in its lower part 6 and a recess 9 made in its external peripheral wall near the end 6, the electrode 1 having an approximately cylindrical shape and being provided with means 14 for mounting and fixing the said electrode in the plasma torch 10.

FIGS. 5*a* and 5*b* and, respectively, 6*a* and 6*b*, each show an electrode more or less the same as that in FIG. 4, but also having serrations or slots 11 made in its lower end 6.

FIGS. 5*a* and 5*b* show an embodiment of an electrode 1 intended, for example, for a plasma torch with ignition by short-circuiting between the electrode 1 and the nozzle 2.

The slots 11 made in the end 6 of the electrode 1 allow the plasma gas to flow when the electrode 1 is in mechanical and electrical contact with the nozzle 2.

This arrangement obtained by a particular geometry of the end 6 of the electrode 1 prevents the short-circuit from being broken and avoids establishing a primer arc in an atmosphere not containing a suitable gas, that is to say mainly consisting of metal vapour, so as to prevent the electrode 1 and the nozzle 2 from being damaged.

The knurling or slots 11 are, for example, of the radial type.

FIGS. 6*a* and 6*b* show a second embodiment of an electrode 1 according to the invention, comprising, on the one hand, a recess 9 in its external peripheral wall and, on the other hand, as shown in FIGS. 5*a* and 5*b*, slots 11 made in its lower end 6.

This electrode 1 is, for example, an electrode having a double gas circuit with gas feed to the branch-off slots, controlled by a section of slots emerging in the recess.

By dint of this arrangement, giving good geometrical matching, the erosion of the emissive material of the electrode may be considerably reduced while at the same time guaranteeing stability of the plasma jet effective for and favourable to carrying out work of high quality on the material to be treated.

Furthermore, this results in a gain in terms of the lifetime of the electrode and an increase in the arc stability by virtue of the judicious combination of a recess 9 and the slots 11.

A plasma torch according to the present invention may advantageously be used in any type of plasma-arc cutting, welding, spraying, surfacing or marking process, particularly in an operation for cutting steel sheets or workpieces.

We claim:

1. Plasma torch comprising a torch body provided with at least one electrode and with at least one coaxial nozzle surrounding at least part of the electrode, said electrode being provided with at least one recess disposed in at least part of its external peripheral wall, at least one recess being placed opposite at least one injection orifice for injecting at least one gas flux into the torch body, so that at least part of the gas flux is deflected and/or guided by the recess.

2. Plasma torch according to claim 1, wherein the recess is disposed over the entire periphery of the external peripheral wall of the electrode.

3. Plasma torch according to claim 1, wherein the recess has a profiled section and is substantially axisymmetric.

4. Plasma torch according to claim 1, wherein the electrode further includes an emissive insert at its lower end.

5. Plasma torch according to claim 4, wherein the emissive insert is made of an element selected from the group consisting of hafnium, zirconium and tungsten.

6. Plasma torch according to claim 1, wherein the electrode further includes at least one slot made in its lower end.

7. Plasma torch according to claim 6, wherein the slot is radial.

8. Plasma torch according to claim 1, wherein the injection orifice and the recess are structured and arranged, one with respect to the other, so as to allow convergent injection of at least part of the gas flux.

9. Plasma torch according to claim 1, wherein the injection orifice and the recess are structured and arranged, one with respect to the other, so as to allow at least part of the gas flux to be injected tangentially to the external peripheral wall of the electrode.

10. Plasma torch according to claim 1, wherein the injection orifice and the recess are structured and arranged, one with respect to the other, so as to allow combined injection of at least part of the gas flux towards the external peripheral wall of the electrode.

11. Plasma torch according to claim 1, wherein said at least one injection orifice has an axis which makes an angle ($\alpha$) of between 90° and 45° with the axis of the electrode.

12. Plasma torch comprising a torch body having at least one electrode and at least one coaxial nozzle surrounding at least part of the electrode, said torch body containing a plasma chamber bounded at least by the electrode and the nozzle, said electrode being provided with at least one recess disposed in at least part of its external peripheral wall, at least one recess being placed at an outlet of at least one injection orifice for injecting at least one gas flux into the torch body in order to allow a change of direction of at least part of the gas flux entering the plasma chamber, when the gas flux comes into contact with the recess.

13. Process of using a plasma torch in at least one of a cutting, welding, marking, surfacing and spring operation, which comprises:

providing a plasma torch comprising a torch body provided with at least one electrode and with at least one coaxial nozzle surrounding at least part of the electrode; said electrode being provided with at least one recess disposed in at least part of its external peripheral wall; at least one recess being placed opposite at least one injection orifice;

injecting at least one gas flux through said at least one injection orifice and into said torch body so that at least part of gas flux is deflected and/or guided by the recess; and discharging the gas flux as a plasma jet via a nozzle outlet opening onto a workpiece positioned below said nozzle outlet opening.

14. Process of using a plasma torch in at least one of a cutting, welding, marking, surfacing and spraying operation, which comprises:

providing a plasma torch comprising a torch body having at least one electrode and at least one coaxial nozzle surrounding at least part of the electrode; said torch body containing a plasma chamber bounded at least by the electrode and the nozzle; said electrode being provided with at least one recess disposed in at least part of its external peripheral wall; at least one recess being placed at an outlet of at least one injection orifice;

injecting at least one gas flux through said at least one injection orifice and into said torch body in order to allow a change of direction of at least part of the gas flux entering the plasma chamber, when the gas flux comes into contact with the recess; and discharging the gas flux as a plasma jet via a nozzle outlet opening onto a workpiece provided below said nozzle outlet opening.

* * * * *